(12) United States Patent
West

(10) Patent No.: US 11,814,912 B2
(45) Date of Patent: Nov. 14, 2023

(54) WASHPIPE SEAL ASSEMBLY

(71) Applicant: National Oilwell Varco, L.P., Houston, TX (US)

(72) Inventor: Neil E. West, Norco, CA (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 17/586,316

(22) Filed: Jan. 27, 2022

(65) Prior Publication Data
US 2023/0235634 A1    Jul. 27, 2023

(51) Int. Cl.
*E21B 21/01*    (2006.01)

(52) U.S. Cl.
CPC ................... *E21B 21/01* (2013.01)

(58) Field of Classification Search
CPC ................. E21B 21/01; E21B 17/05
See application file for complete search history.

(56) References Cited

U.S. PATENT DOCUMENTS

| | | |
|---|---|---|
| 6,007,105 A | 12/1999 | Dietle et al. |
| 7,789,161 B2 | 9/2010 | Riley et al. |
| 2005/0206090 A1* | 9/2005 | Bunn .................... F16J 15/3236 277/549 |
| 2007/0007002 A1 | 1/2007 | Martin |
| 2008/0067754 A1* | 3/2008 | Schroeder .............. F16J 15/006 277/437 |
| 2012/0038111 A1 | 2/2012 | Meling et al. |
| 2013/0299238 A1 | 11/2013 | Weaver |
| 2018/0231432 A1* | 8/2018 | Deel ....................... E21B 21/08 |

FOREIGN PATENT DOCUMENTS

EP    1469243 A1    10/2004

OTHER PUBLICATIONS

PCT/US2023/010019 International Search Report and Written Opinion dated Apr. 12, 2023 (12 p.).

* cited by examiner

*Primary Examiner* — D. Andrews
*Assistant Examiner* — Ronald R Runyan
(74) *Attorney, Agent, or Firm* — CONLEY ROSE, P.C.

(57) ABSTRACT

A washpipe assembly for a rotational device includes a gland assembly, a washpipe positioned within the gland assembly, and a seal assembly positioned about the washpipe within the gland assembly. The seal assembly includes a plurality of ring seals, a plurality of annular chambers positioned between the ring seals along the washpipe, and a pressure manifold fluidly coupled to the plurality of annular chambers. The pressure manifold is configured to receive a first fluid pressure and is configured to apply a plurality of pressures to the annular chambers, and the plurality of pressures are each less than the first fluid pressure.

14 Claims, 7 Drawing Sheets

US 11,814,912 B2

WASHPIPE SEAL ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

To form a subterranean borehole (e.g., for accessing subterranean hydrocarbons and/or other resources), an earth-boring drill bit may be connected to the lower end of a drill string and then rotated. With weight-on-bit (WOB) applied, the rotating drill bit may engage a subterranean formation and thereby form or lengthen the borehole.

During drilling operations, the drill string and/or drill bit may be rotated by a top drive, power swivel, rotary table or other rotational device. The drill string may comprise a plurality of tubular members (e.g., pipes) that are connected (e.g., threaded) end-to-end. As the drill bit is rotated and engaged with the subterranean formation, drilling fluid (e.g., drilling mud) may be circulated through the drill string, out of the drill bit, and back up the borehole via an annular region outside of the drill string. The drilling fluid may perform several functions. For instance, the drilling fluid may cool the drill bit, sweep formation cuttings away from the drill bit and toward the surface, and lubricate the movement of the drill bit and drill string during operations.

The drilling fluid may be injected into the drill string via the rotational device at the surface. Thus, the rotational device may include a fluid flow path for routing the high-pressure drilling fluid into the drill string. In addition, the rotational device may include one or more seal assemblies to contain the high-pressure drilling fluid during operations.

BRIEF SUMMARY

Some embodiments disclosed herein are directed to a washpipe assembly for a rotational device. In some embodiments, the washpipe assembly comprises a gland assembly, a washpipe positioned within the gland assembly, and a seal assembly positioned about the washpipe within the gland assembly. The seal assembly comprises a plurality of ring seals, a plurality of annular chambers positioned between the ring seals along the washpipe, and a pressure manifold fluidly coupled to the plurality of annular chambers. The pressure manifold is configured to receive a first fluid pressure and is configured to apply a plurality of pressures to the annular chambers, and the plurality of pressures are each less than the first fluid pressure.

Some embodiments disclosed herein are directed to a rotational device for rotating a drilling string and drill bit. In some embodiments, the rotational device comprises a washpipe including a central axis and a throughbore and a gland assembly to receive an end of the washpipe. The washpipe is configured to rotate about the central axis relative to the gland assembly. In addition, the rotational device comprises a seal assembly positioned within the gland assembly and about the washpipe. The seal assembly comprises a plurality of seal rings axially spaced along the central axis and a plurality of annular chambers. Each of the annular chambers is axially spaced between axially adjacent pairs of the plurality of seal rings. In addition, the seal assembly comprises a pressure manifold fluidly coupled to the plurality of annular chambers. The pressure manifold is configured to receive a first fluid pressure from the throughbore of the washpipe and emit a plurality of pressures to the plurality of annular chambers, and the plurality of pressures are configured to expose each of the plurality of seal rings to a differential pressure that is less than the first fluid pressure.

In some embodiments, the rotational device comprises a washpipe including a central axis and a throughbore. The washpipe forms a part of a fluid flow path through the rotational device. In addition, the rotational device comprises a gland assembly to receive an end of the washpipe. The washpipe is configured to rotate about the central axis relative to the gland assembly. Further, the rotational device comprises a seal assembly positioned within the gland assembly and about the washpipe. The seal assembly comprises a first ring seal positioned about the washpipe, a second ring seal positioned about the washpipe, and an annular chamber positioned axially between the first ring seal and the second ring seal along the central axis of the washpipe. In addition, the seal assembly comprises a pressure manifold configured to receive a first fluid pressure from the fluid flow path and configured to apply a second fluid pressure to the annular chamber that is less than the first fluid pressure.

Embodiments described herein comprise a combination of features and characteristics intended to address various shortcomings associated with certain prior devices, systems, and methods. The foregoing has outlined rather broadly the features and technical characteristics of some of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

A rotational device (e.g., top drive, power swivel, rotary table, etc.) for rotating a tubular string and drill bit may include a fluid flow path and seal assemblies for containing the high-pressure drilling fluid when forming a subterranean borehole as previously described. Because the rotational device is driving rotation of the drill string, the fluid flow path may be comprised of components and members that are fixed and that are configured to rotate with the drill string during operations. Thus, the seal assembly(ies) within the rotational device may include one or more dynamic seals positioned between fixed and rotating components of the rotational device.

The operational life of the dynamic seals in a rotational device may be limited due to the relatively high pressure of the drilling fluid. For instance, in some circumstances, the pressure of the drilling fluid may be as much as 10,000 pounds per square inch gauge (psig) or more.

Accordingly, embodiments disclosed herein include seal assemblies for a washpipe of a rotational device that are configured to expose each of a plurality of sealing members to a portion of the total pressure of the drilling fluid. In some embodiments, the seal assemblies may equally (or uniformly) divide the total pressure of the drilling fluid across a plurality of sealing members. Thus, through use of the seal assemblies of the embodiments disclosed herein, the sealing members may be exposed to generally lower pressures so that their operational life may be increased and so that, in some cases, lower capacity seals may be utilized.

Figure 1:
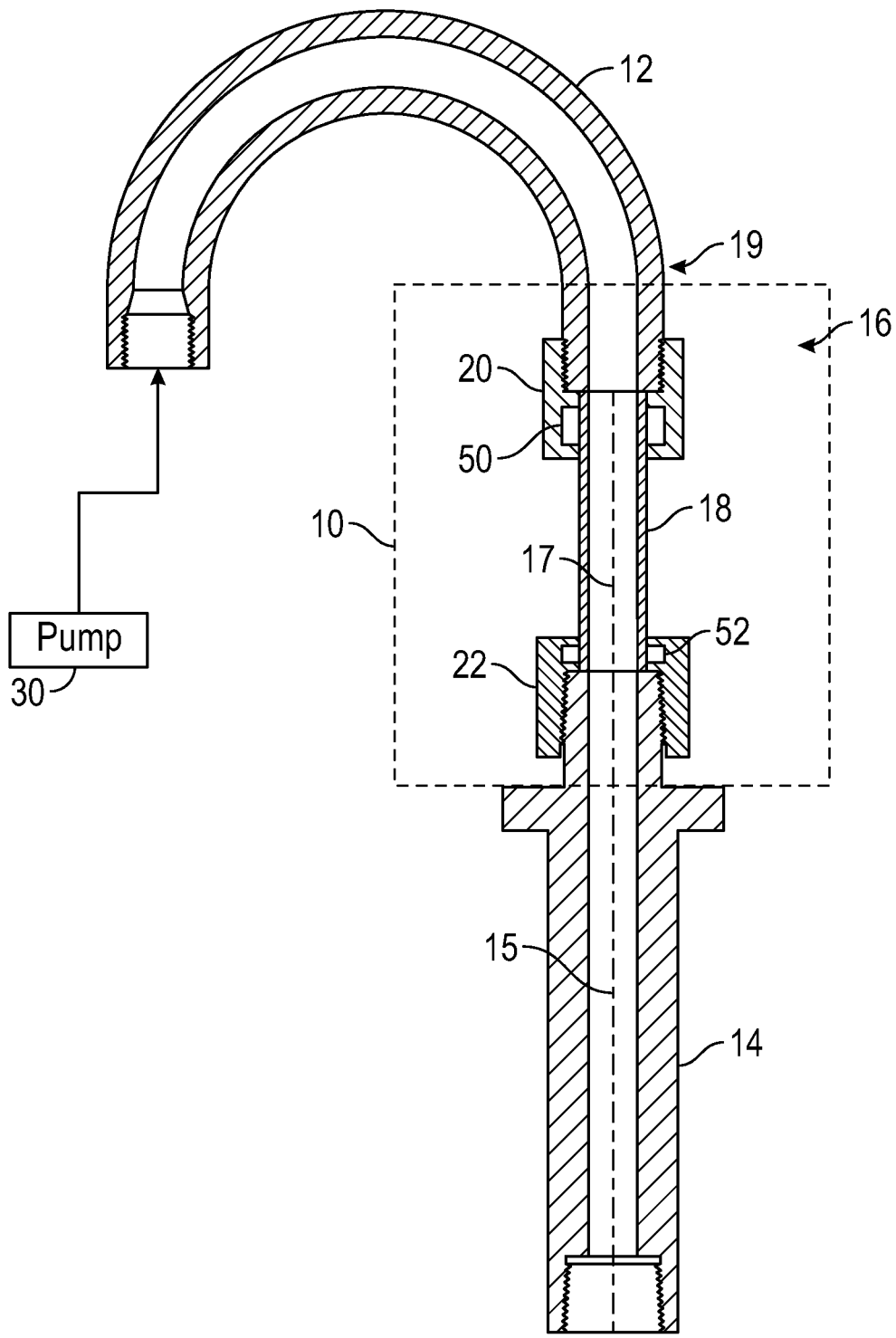
FIG. 1 is a side cross-sectional view of a rotational device including a seal assembly according to some embodiments.

Referring now to FIG. 1, a rotational device 10 including a seal assembly according to some embodiments is shown. In some embodiments, the rotational device 10 may be a top drive that is suspended above a drilling rig floor. Thus, the rotational device 10 may be referred to herein a "top drive 10." However, in some embodiments rotational device 10 may comprise a power swivel, rotary table, or other suitable rotational device. Thus, referring to rotational device 10 as a top drive should not be interpreted as limiting the use of the term rotational device in various embodiments.

The top drive 10 may include a rotating tubular member 14 that is configured to be coupled (e.g., threadably coupled) to an uphole end (not shown) of a drill string. The top drive 10 may include a suitable driver (e.g., hydraulic or electric motor) that is configured to rotate the rotating tubular member 14 about a central or longitudinal axis 15 thereof. In addition, the top drive 10 comprises or is coupled to a gooseneck 12 that is fluidly coupled (e.g., via suitable hoses, pipes, etc.) to a pump 30. During operations, pump 30 may deliver high pressure drilling fluid to the top drive 10 via gooseneck 12.

Further, a washpipe assembly 16 is coupled between the gooseneck 12 and the rotating tubular member 12. Together, the gooseneck 12, washpipe assembly 16, and tubular member 14 define a fluid flow path 19 that extends through the top drive 10 and that supplies the drilling fluid to the drill string and drill bit (not shown) during drilling operations.

The washpipe assembly 16 includes washpipe 18 that is coupled to the gooseneck 12 via a first or upper gland assembly 20 and is coupled to the rotating tubular member 14 via a second or lower gland assembly 22. The washpipe 18 comprises a tubular member that includes a central or longitudinal axis 17. During operations, the axis 17 may be generally aligned with axis 15 of tubular member, and then washpipe 18 is rotated along with the rotating tubular member 14 about the aligned axes 15, 17 via the lower gland assembly 22. Conversely, the upper gland assembly 20 and gooseneck 12 do not rotate and are therefore fixed relative to washpipe 18. Thus, during operations, the washpipe 18 may rotate about axis 17 within and relative to the upper gland assembly 20.

A first or upper seal assembly 50 may be positioned between the washpipe 18 and the upper gland assembly 20, and a second or lower seal assembly 52 may be positioned between the washpipe and the lower gland assembly 22. The seal assemblies 50, 52 may prevent the high-pressure drilling fluid from leaking out of the fluid flow path 19 between the gland assemblies 20, 22, respectively, and washpipe 18 during operations. Because the lower gland assembly 22 rotates along with the washpipe 18 during operations, the lower seal assembly 52 may form a static seal. However, because the washpipe 18 rotates within and relative to the upper gland assembly 20, the upper seal assembly 50 may form a dynamic seal. Further details of embodiments of the washpipe assembly 16 and the seal assemblies 50, 52 is provided below.

Figure 2:
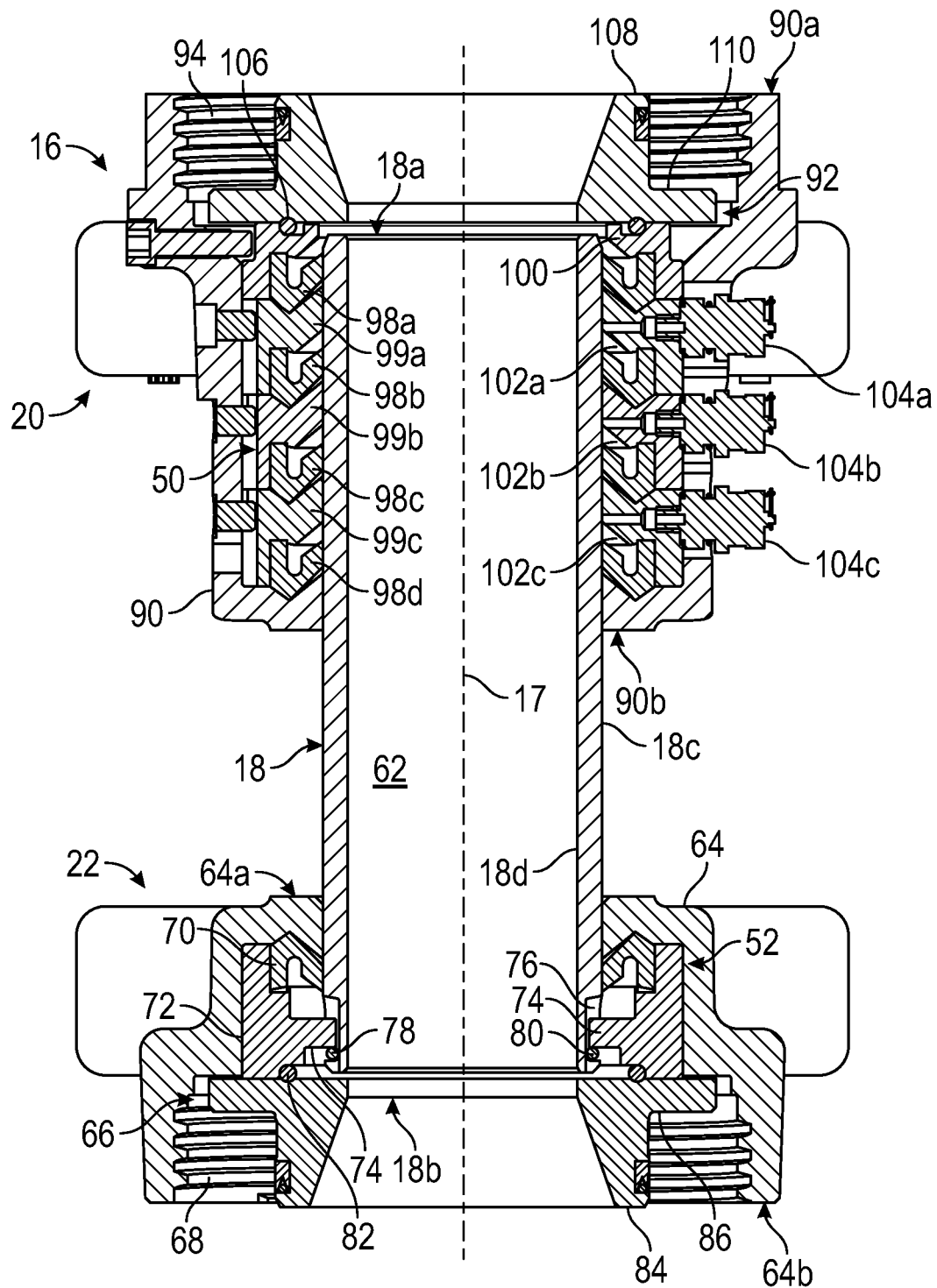
FIG. 2 is a side cross-sectional view of a washpipe assembly of the rotational device of FIG. 1 according to some embodiments.

Referring now to FIG. 2, an embodiment of washpipe assembly 16 is shown. As previously described, washpipe assembly 16 includes a washpipe 18, upper gland assembly 20, lower gland assembly 22, upper seal assembly 50 positioned within upper gland assembly 20, and lower seal assembly 52 positioned within lower gland assembly 22. Each of these components is described in more detail below with respect to the embodiment shown in FIG. 2.

As previously described, washpipe 18 is a tubular member having a first or upper end 18a, and a second or lower end 18b opposite the upper end 18a along axis 17. In addition, the washpipe 18 includes a radially outer (or radially outermost) cylindrical surface 18c that extends axially along axis 17 between ends 18a, 18b, and a radially inner (or radially innermost) cylindrical surface 18d that extends axially along axis 17 between ends 18a, 18b. The radially inner surface 18d defines a throughbore 62 extending through the washpipe 18 between ends 18a, 18b. The throughbore 62 may form a portion of the fluid flow path 19 extending through the top drive 10 previously described above and shown in FIG. 1.

Referring still to FIG. 2, lower gland assembly 22 includes a housing 64 having a first or upper end 64a, a second or lower end 64b opposite upper end 64a, and a through passage or cavity 66 extending between the ends 64a, 64b. A plurality of internal threads 68 are formed in the through passage 66 at (or near) the lower end 64b. The internal threads 68 may threadably couple the housing 64 to the rotating tubular member 14 previously described and shown in FIG. 1. Lower end 18b of washpipe 18 is inserted within the through passage 66 from the upper end 64a.

Lower seal assembly 52 is positioned within through passage 66 and is positioned circumferentially around radially outer surface of 18c of washpipe 18 with respect to axis 17. As previously described, during operations, the seal assembly 52 and lower gland assembly 22 (including housing 64) may rotate about axis 17 along with the washpipe 18. Accordingly, the lower seal assembly 52 forms a static seal with radially outer surface 18c of washpipe 18.

The lower seal assembly 52 includes a resilient sealing ring (or packing ring) 70, and a collar 72. The sealing ring 70 may comprise an annular member having a chevron cross-section that is to engage with the radially outer surface 18c of washpipe 18 to prevent (or at least restrict) fluid flow (e.g., of drilling fluid) between the radially outer surface 18c of washpipe 18 and housing 64 during operations. In some embodiments, the sealing ring 70 may comprise an elastomeric material.

Collar 72 is positioned within through passage 66, adjacent the sealing ring 70. During operations, collar 72 may activate and retain the sealing ring 70 within through passage 64. The collar 72 may comprise a plurality of projections 74 that extend radially inward toward axis 17, and that are circumferentially spaced from one another about axis 17 (two such projections 74 are shown in the cross-sectional view of FIG. 2). The projections 74 may align with an extend into a plurality of axially extending and circumferentially spaced grooves or recesses 76 formed on the radially outer surface 18c of washpipe 18 at or proximate to lower end 18b. A circumferentially extending groove or recess 78 is also formed on radially outer surface 18c of washpipe 18 that intersects with the plurality of axially extending grooves 76. A snap ring 80 is positioned in the circumferentially extending groove 78 that is to engage with the projections 74 on collar 72 and thus retain collar 72 and seal ring 70 within the through passage 66 during operations.

An annular seal member 82 (e.g., an O-ring) is positioned on an end of the collar 72 that is opposite the seal ring 70. During operations, when rotating tubular member 14 (FIG. 1) is threadably engaged with threads 68 of housing 64, a cap 84 is compressed against the collar 72 via engagement of an end of the rotating tubular member 14 and a flange 86 of the cap 84 so that the annular seal member 82 forms a seal between the collar 72 and cap 84.

Referring still to FIG. 2, upper gland assembly 20 includes a housing 90 having a first or upper end 90a, a second or lower end 90b opposite upper end 90a, and a through passage or cavity 92 extending between the ends 90a, 90b. A plurality of internal threads 94 are formed in the through passage 92 at (or near) the upper end 90a. The internal threads 94 may threadably couple the housing 90 to the gooseneck 12 previously described and shown in FIG. 1. Upper end 18a of washpipe 18 is inserted within the through passage 92 from the lower end 90b.

Upper seal assembly 50 is positioned within through passage 92 and is positioned circumferentially around radially outer surface of 18c of washpipe 18 with respect to axis 17. As previously described, during operations, the washpipe 18 rotates about axis 17 relative to upper seal assembly 50 and upper gland assembly 20. Accordingly, the upper seal assembly 50 forms a dynamic seal with radially outer surface 18c of washpipe 18.

Upper seal assembly 50 includes a plurality of seal rings 98a, 98b, 98c, 98d. The seal rings 98a, 98b, 98c, 98d may each be similar to the seal ring 70 of lower seal assembly 52. Thus, the seal rings 98a, 98b, 98c, 98d may each comprise an annular member having a chevron cross-section that is to engage with the radially outer surface 18c of washpipe 18 to prevent (or at least restrict) fluid flow (e.g., of drilling fluid) between the radially outer surface 18c of washpipe 18 and housing 90 during operations. In some embodiments, there are a total of four seal rings 98a, 98b, 98c, 98d; however, any suitable number of seal rings 98a, 98b, 98c, 98d may be included in the upper seal assembly 50 in other embodiments. As with seal ring 70, in some embodiments each of the seal rings 98a, 98b, 98c, 98d may comprise an elastomeric material.

The seal rings 98a, 98b, 98c, 98d may be axially stacked within the housing 90 with respect to axis 17. Thus, moving axially within the through passage 92 of housing 90 from the upper end 90a to the lower end 90b, the seal rings 98a, 98b, 98c, 98d include a first seal ring 98a, a second seal ring 98b, a third seal ring 98c, and a fourth seal ring 98d. The first seal ring 98a may be more proximate the upper end 90a of housing 90 than the seal rings 98b, 98c, 98d, the fourth seal ring 98d may be more proximate the lower end 90b of housing 90 than the seal rings 98a, 98b, 98c, the second seal ring 98b may be axially positioned between the first seal ring 98a and the third seal ring 98c, and the third seal ring 98c may be axially positioned between the second seal ring 98b and the fourth seal ring 98d.

A plurality of packing rings 99a, 99b, 99c are positioned axially between axially adjacent pairs of the seal rings 98a, 98b, 98c, 98d. In particular, with respect to axis 17, a first packing ring 99a is positioned axially between the first seal ring 98a and second seal ring 98b, a second packing ring 99b is positioned axially between the second seal ring 98b and the third seal ring 98c, and a third packing ring 99c is positioned axially between the third seal ring 98c and the fourth seal ring 98d. The packing rings 99a, 99b, 99c, 99d may maintain a suitable spacing between the seal rings 98a, 98b, 98c, 98d so that annular chambers 102a, 102b, 102d are formed axially between axially adjacent pairs of the seal rings 98a, 98b, 98c, 98d. Specifically, the first packing ring 99a forms a first annular chamber 102a axially between the first seal ring 98a and the second seal ring 98b, the second packing ring 99b forms a second annular chamber 102b axially between the second seal ring 98b and the third seal ring 98c, and the third packing ring 99c forms a third annular chamber 102c axially between the third seal ring 98c and the fourth seal ring 98d.

A plurality of fluid ports 104a, 104b, 104c are fluidly coupled to the plurality annular chambers 102a, 102b, 102c, respectively. As will be described in more detail below, the annular chambers 102a, 102b, 102c may be pressurized via the fluid ports 104a, 104b, 104c, respectively, to control the differential pressure across each seal ring 98a, 98b, 98c, 98d during operations.

A top collar 100 (or more simply "collar 100") is engaged with the first seal ring 98a and positioned axially between the first seal ring 98a and the upper end 90a of housing 90. The collar 100 includes an annular seal member 106 (e.g., an O-ring) that is positioned on an end of the collar 100 that is opposite the first seal ring 98a. During operations, when gooseneck 12 (FIG. 1) is threadably engaged with threads 94 of housing 90, a cap 108 is compressed against the collar 100 via engagement of an end of the gooseneck 12 and a flange 110 of the cap 108 so that the annular seal member 106 forms a seal between the collar 100 and cap 108.

Figure 3:
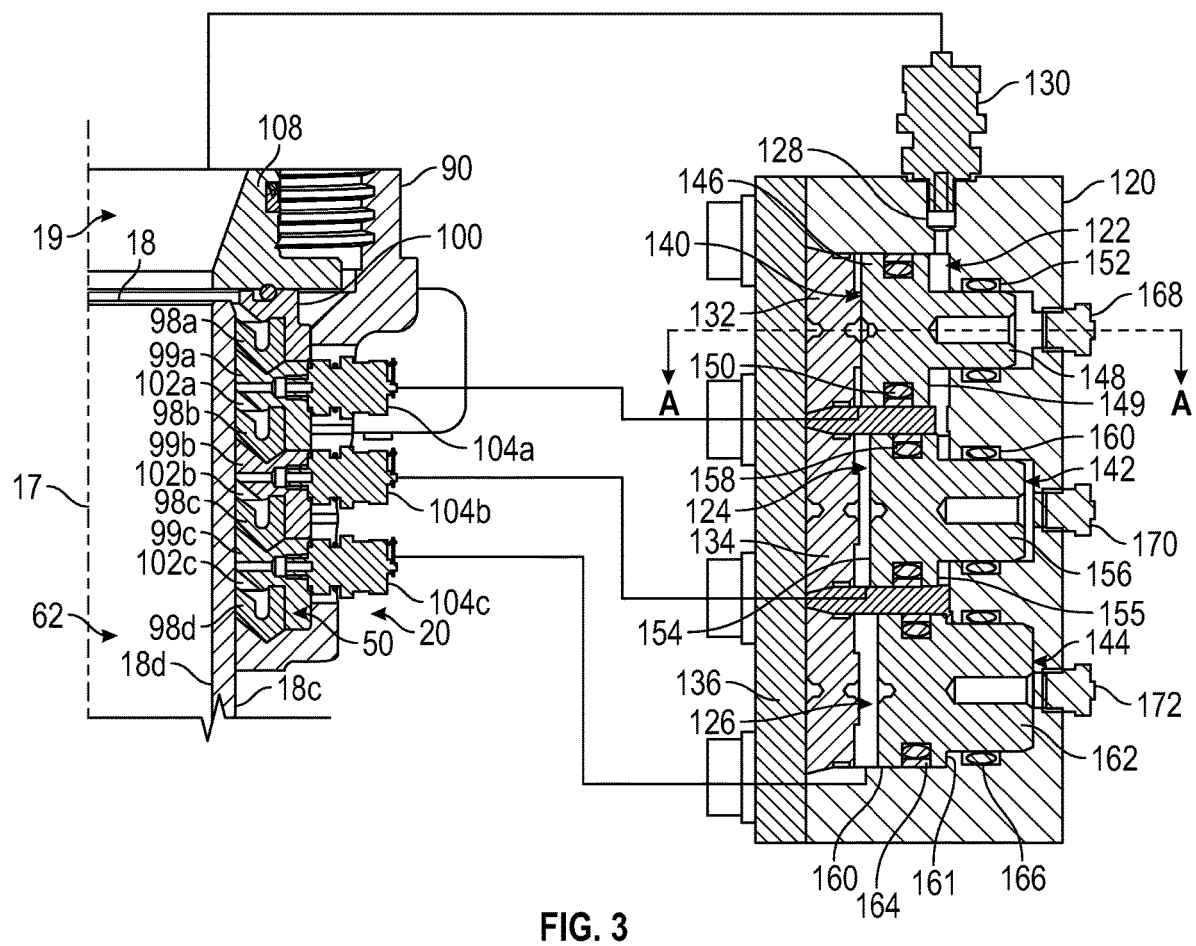
FIG. 3 is a cross-sectional view of an upper gland assembly of the washpipe assembly of FIG. 2 and a pressure manifold according to some embodiments.

Referring now to FIG. 3, the annular chambers 102a, 102b, 102c formed between the sealing rings 98a, 98b, 98c, 98d of seal assembly 50 may be fluidly coupled to a pressure manifold 120. Generally speaking, the pressure manifold 120 is to apply selected pressures to the annular chambers 102a, 120b, 102c so as to selectively control the differential pressure applied across each of the seal rings 98a, 98b, 98c, 98d during operations. The pressure manifold 120 may be considered part of the seal assembly 50 and more broadly part of the washpipe assembly 16.

The pressure manifold 120 (or more simply "manifold 120") includes a plurality of chambers 122, 124, 126 that are each fluidly coupled to an inlet pressure port 130. The chambers 122, 124, 126 may be referred to herein as "manifold chambers." The inlet pressure port 130 is coupled (e.g., fluidly coupled, pressure coupled, etc.) to the fluid flow path 19. Thus, during operations, the full pressure of the drilling fluid is communicated from the fluid flow path 19 to the inlet pressure port 130. The chambers 122, 124, 126 are fluidly coupled to the annular chambers 102a, 102b, 102c, respectively, via the fluid ports 104a, 104b, 104c, respectively.

Each chamber 122, 124, 126 contains a plunger 140, 142, 144, respectively. The plungers 140, 142, 144 are each generally T-shaped in cross-section. Specifically, a first plunger 140 includes a first cylindrical portion 146 and a second cylindrical portion 148. The first cylindrical portion 146 has a larger outer diameter than the second cylindrical portion 148 so that an annular shoulder 149 is defined between the cylindrical portions 146, 148.

In addition, a second plunger 142 includes a first cylindrical portion 154 and a second cylindrical portion 156. The first cylindrical portion 154 has a larger outer diameter than the second cylindrical portion 156 so that an annular shoulder 155 is defined between the cylindrical portions 154, 156.

Further, a third plunger 144 includes a first cylindrical portion 160 and a second cylindrical portion 162. The first cylindrical portion 160 has a larger outer diameter than the second cylindrical portion 162 so that an annular shoulder 161 is defined between the cylindrical portions 160, 162.

Referring still to FIG. 3, outer surfaces of the plungers 140, 142, 144 are sealingly engaged with the inner walls of the chambers 122, 124, 126. In particular, the first plunger 140 includes a first annular sealing member 150 engaged between the first cylindrical portion 146 and the first chamber 122, and a second annular sealing member 152 engaged between the second cylindrical portion 148 and the first chamber 122. In addition, the second plunger 142 includes a first annular sealing member 158 engaged between the first cylindrical portion 154 and the second chamber 124, and a second annular sealing member 160 engaged between the second cylindrical portion 156 and the second chamber 124. Further, the third plunger 144 includes a first annular sealing member 164 engaged between the first cylindrical portion 160 and the third chamber 126, and a second annular sealing member 166 engaged between the second cylindrical portion 162 and the third chamber 126. The annular sealing members 150, 152, 158, 160, 164, 166 may comprise any suitable sealing device, such as, for instance, an O-ring, a seal ring, wiper seal, or any combination thereof.

Each chamber 122, 124, 126 includes a cap 132, 134, 136 and a vent 168, 170, 172 positioned on opposing sides of the plungers 140, 142, 144, respectively, to seal the chambers 122, 124, 126, respectively, from the outer environment. During operations, the high pressure of the drilling fluid is communicated from the fluid flow path 19 to the inlet port 130 as previously described. The pressure is the communicated into the chambers 122, 124, 126 so that the annular shoulders 149, 155, 161 are exposed to the pressure of the drilling fluid within the chambers 122, 124, 126, respectively. The high pressure of the drilling fluid on the annular shoulders 149, 155, 161 causes the plungers 140, 142, 144, respectively to shift toward caps 132, 134, 136 within chambers 122, 124, 126, respectively, so as to increase a pressure within the annular chambers 102a, 102b, 102c, respectively.

However, the sizes of the annular shoulders 149, 155, 161 are adjusted so that a selected fraction of the total drilling fluid pressure is communicated to the annular chambers 102a, 102b, 102c during operations. Specifically, the annular shoulder 149 may have a surface area $SA_{149}$, the annular shoulder 155 may have a surface areas $SA_{155}$, and the annular shoulder 161 may have a surface area $SA_{161}$. The surface area $SA_{149}$ may be larger than the surface areas $SA_{155}$, $SA_{161}$, and the surface area $SA_{155}$ may be larger than the surface area $SA_{161}$ (i.e., $SA_{149}$>$SA_{155}$>$SA_{161}$). As a result, a larger fraction of the drilling fluid pressure is communicated to the first annular chamber 102a via the first plunger 140 than to the annular chambers 102b, 102c via the plungers 142, 144, respectively. Likewise, a larger fraction of the drilling fluid pressure is communicated to the second annual chamber 102b via the plunger 142 than to the third annual chamber 102c via the plunger 144. In some embodiments, the reductions in the pressure communicated to the annular chambers 102a, 102b, 102c may be even or uniform. For instance, in some embodiments, the pressure communicated to the first annular chamber 102a may be about 75% of the drilling fluid pressure, the pressure communicated to the second annular chamber 102b may be about 50% of the drilling fluid pressure, and the pressure communicated to the third annular chamber 102c may be about 25% of the drilling fluid pressure. The magnitudes of the surface areas $SA_{149}$, $SA_{155}$, $SA_{161}$ may be adjusted to accomplish the desired pressures communicated to the annular chambers 102a, 102b, 102c.

In some embodiments, drilling fluid fills the manifold 120 (including chambers 122, 124, 126) and annular chambers 102a, 102b, 102c. In some embodiments, drilling fluid may be communicated to the manifold 120 (including chambers 122, 124, 126), and a different pressure communication fluid (e.g., oil, grease, hydraulic fluid, etc.) may fill the annular chambers 102a, 102b, 102c and a portion of the chambers 122, 124, 126 (e.g., the portions extending between the plungers 140, 142, 144 and caps 132, 134, 136, respectively). In some embodiments, both the annular chambers 102a, 102b, 102c, and manifold 120 (including chambers 122, 124, 126) are filled with pressure communication fluid (one fluid or multiple fluids) that are different from the drilling fluid.

Referring still to FIG. 3, during a drilling operation, high-pressure drilling fluid is flowed through the washpipe 18 (along the fluid flow path 19) and the high pressure of the drilling fluid is communicated to pressure manifold 120 so that fractional portions of that high pressure are communicated to the annular chambers 102a, 102b, 102c as previously described. In these embodiments, when the full value of the drilling fluid pressure is applied to the first seal ring 98a via the fluid flow path 19, each of the seal rings 98a, 98b, 98c, 98d is exposed to a fractional component of the total pressure so that their operational life may be increased. Specifically, for the first seal ring 98a, the full drilling fluid pressure (e.g., 100% of the drilling fluid pressure) may be applied to a first side of the seal ring 98a and about 75% of the drilling fluid pressure may be applied to a second, opposite side of the seal ring 98a via the annular chamber 102a and manifold 120 as previously described. As a result, the first seal ring 98a is exposed to a differential pressure that is about 25% of the total drilling fluid pressure.

Likewise, for the second seal ring 98b, about 75% of the drilling fluid pressure is applied to a first side of the second seal ring 98b via the first annular chamber 102a, while a second, opposite side of the second seal ring 98b is exposed to about 50% of the drilling fluid pressure via the second annular chamber 102b. As a result, the second seal ring 98b is also exposed to a differential pressure that is about 25% of the total drilling fluid pressure.

Further, for the third seal ring 98c, about 50% of the drilling fluid pressure is applied to a first side of the third seal ring 98c via the second annular chamber 102b, while a second, opposite side of the third seal ring 98c is exposed to about 25% of the drilling fluid pressure via the third annular chamber 102c. As a result, the third seal ring 98c is also exposed to a differential pressure that is about 25% of the total drilling fluid pressure.

Still further, for the fourth seal ring 98d, about 25% of the drilling fluid pressure is applied to a first side of the fourth seal ring 98d via the third annular chamber 102c, while a second, opposite side of the fourth seal ring 98d is exposed to atmospheric conditions. As a result, the fourth seal ring 98*d* is also exposed to a differential pressure that is about 25% of the total drilling fluid pressure.

Accordingly, the pressures applied to the annular chambers 102*a*, 102*b*, 102*c* by the pressure manifold 120 allow a total differential pressure applied to each of the seal rings 98*a*, 98*b*, 98*c*, 98*d* to be about 25% of the total drilling fluid pressure. As a result, the total pressure of the drilling fluid may be distributed across each of the seal rings 98*a*, 98*b*, 98*c*, 98*d*. In some embodiments, the distribution of the total pressure of the drilling fluid may be even or uniform across the seal rings 98*a*, 98*b*, 98*c*, 98*d* so that each seal ring of the upper seal assembly 50 may see the same fraction of the total drilling fluid pressure in fluid flow path 109 (FIG. 1).

Because the seal rings 98*a*, 98*b*, 98*c*, 98*d* are exposed to substantially reduced pressures, the operational life of the seal rings 98*a*, 98*b*, 98*c*, 98*d* may be substantially increased, even for elevated drilling pressures (e.g., 10,000 psig). In some embodiments, the reduced pressures on seal rings 98*a*, 98*b*, 98*c*, 98*d* may also allow for the use of seal designs that have a substantially lower pressure rating (which in turn may reduce components costs for the washpipe assembly 16, and/or allow for seal constructions that would not otherwise be feasible).

Figure 4:
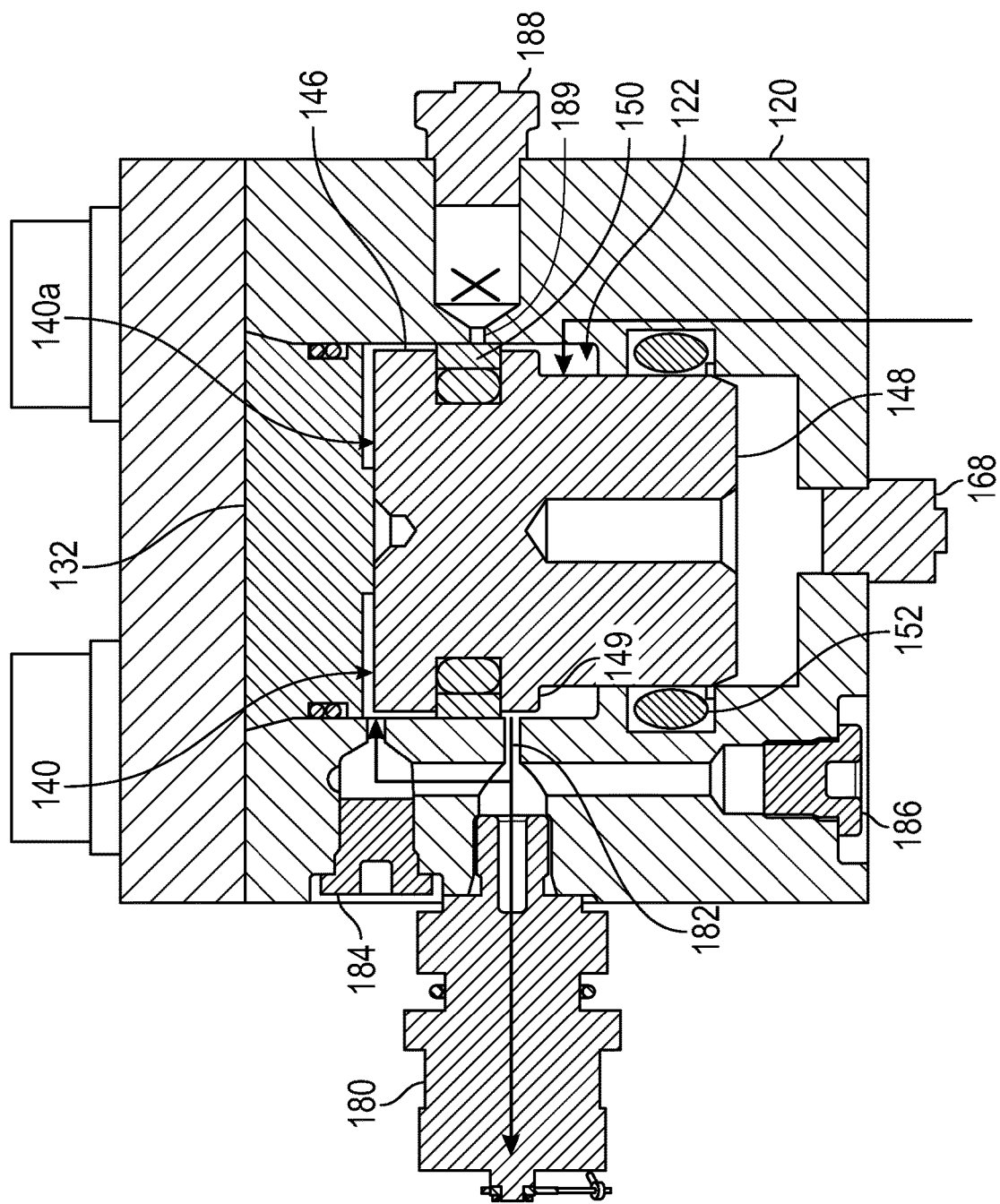
FIGS. 4-6 are cross-sectional views of a chamber of the pressure manifold of FIG. 3 showing different positions of a plunger within a chamber of the pressure manifold according to some embodiments.
Figure 5:
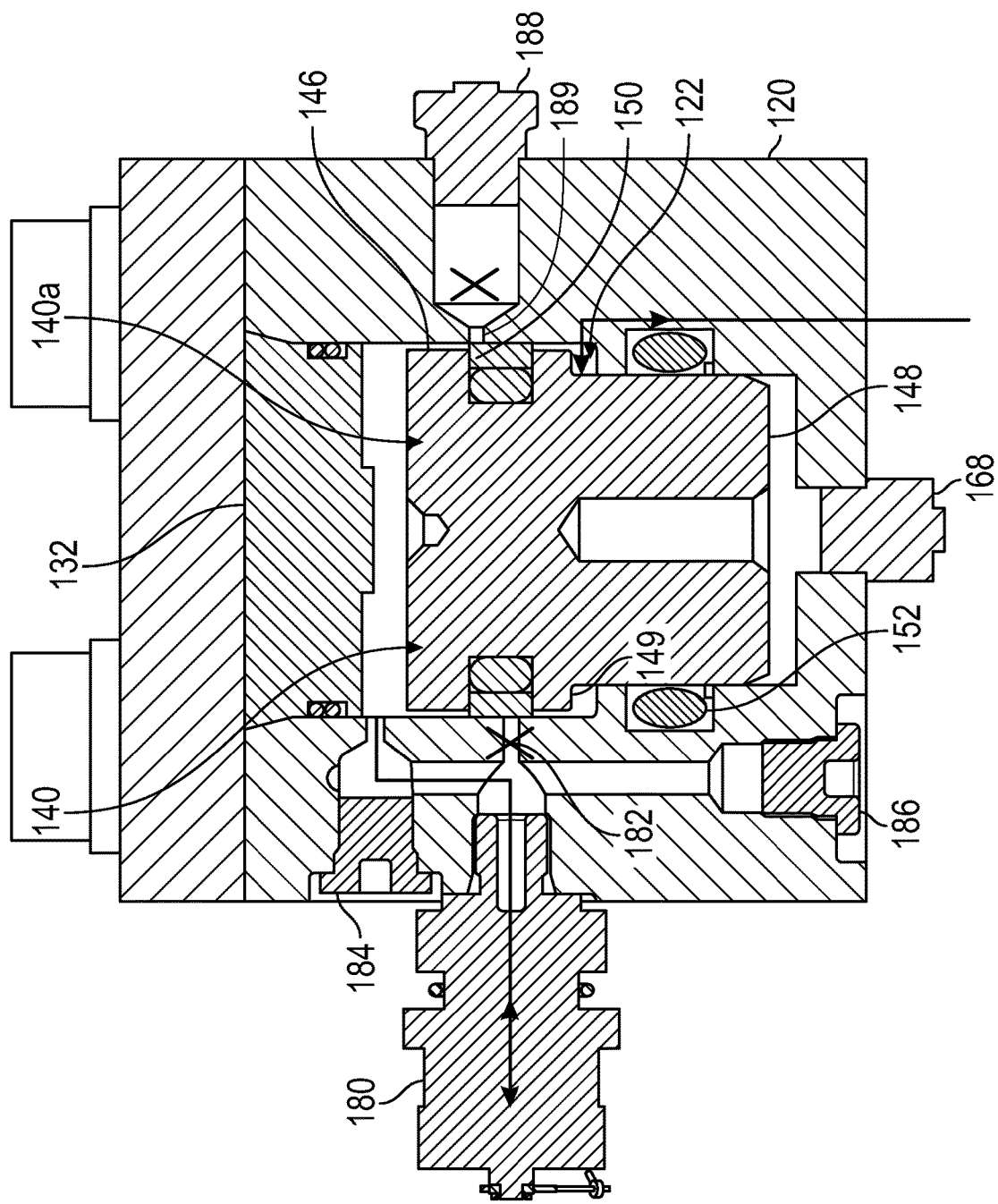
Figure 6:
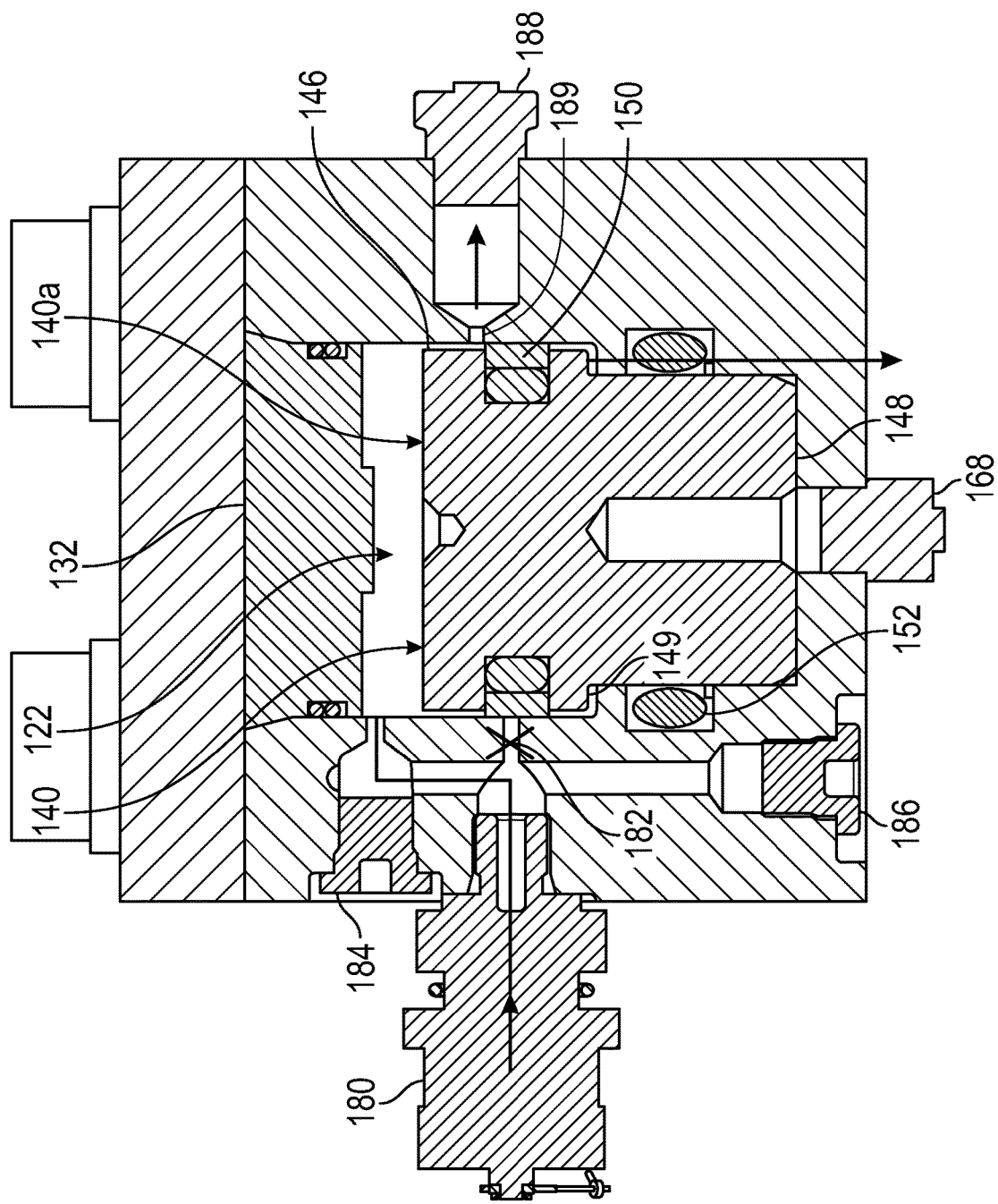

Referring now to FIGS. 4-6, cross-sectional views of the pressure manifold 120 are shown. Each of the cross-sectional views of FIGS. 4-6 are taken along section A-A shown in FIG. 3. Each of the cross-sectional views of FIGS. 4-6 show different stages of a priming procedure for the chambers 122, 124, 126 (FIG. 3); however, it should be appreciated that the priming procedure for the other chambers 124, 126 is generally the same.

Referring first to FIG. 4, initially when drilling fluid (or the pressure of drilling fluid) is supplied to the pressure manifold 120, it is supplied to the chamber 122 via the inlet port 130 (FIG. 3) so that it is communicated to the annular shoulder 149 as previously described. The pressure of the drilling causes the plunger 140 to shift toward the cap 132 within chamber 122 so that annular seal member 150 advances past an internal port 182 that communicates the drilling fluid pressure back into the chamber 122 between the plunger 140 and cap 132. In addition, the drilling fluid pressure may also be communicated from the port 182 through an outlet port 180 which is in communication with the first annular chamber 102*a* in upper gland assembly 20 (FIG. 3). As the fluid pressure increases within the chamber 122 between the plunger 140 and cap 132, the plunger 140 is shifted away from cap 132 within chamber 122 to block the internal port 182.

Referring now to FIG. 5, once the port 182 is blocked by the annular seal member 150, the pressure on the front side of the plunger 140 (between the cap 132 and the plunger 140) may communicate with the first annular chamber 102*a* (FIG. 3) via the output port 180 while the drilling fluid pressure continues to be communicated to the annular shoulder 149 along an opposite side of the plunger 140. In this state, the pressure supplied to the output port 180 (and thus also the first annular chamber 102*a* of FIG. 3) is fraction of the total drilling fluid pressure as determined by the surface area of annular shoulder ($SA_{149}$). In some embodiments, the pressure supplied to the outlet port 180 in the state shown in FIG. 5 is approximately 75% of the drilling fluid pressure applied to annular shoulder 149 as previously described.

Referring now to FIG. 6, if seal ring 98*a* (FIG. 3) fails, both sides of the plunger 140 may be exposed to approximately the same pressure (e.g., the full drilling fluid pressure). Because the pressure applied to a front side 140*a* of the plunger 140 (along the side of plunger 140 facing cap 132) is applied over a larger surface area than the annular shoulder 149, the increased pressure on the front side 140*a* of the plunger 140 shifts the plunger farther away from cap 132 within chamber 122 until annular seal member 150 exposes a port 189 to emit the fluid on the front side 140*a* of the plunger 140 out of chamber 122 via a vent 188.

As previously described, in some embodiments the fractional distribution (e.g., even or uniform distribution) of the total fluid pressure across multiple sealing members within the upper seal assembly 50 may allow for use of sealing members having a pressure rating substantially below that of the total fluid pressure of the drilling fluid. For instance, reference is now made to FIG. 7, which shows an embodiment of an upper gland assembly 220 and upper seal assembly 250 that may be used within the washpipe assembly 16 of FIG. 1 in place of upper gland assembly 20 and upper seal assembly 50 (FIG. 2) according to some embodiments.

While more details of upper gland assembly 220 and upper seal assembly 250 are provided below according to some embodiments, it should be appreciated that upper seal assembly 250 utilizes slip-ring seals 298*a*, 298*b*, 298*c*, 298*d* in place of the chevron-style seal rings 98*a*, 98*b*, 98*c*, 98*d*, respectively, previously described above for upper seal assembly 50. The slip-ring seals 298*a*, 298*b*, 298*c*, 298*d* may comprise simpler slip-ring seals that do not utilize separate packing rings (e.g., packing rings 99*a*, 99*b*, 99*c*, 99*d*). In addition, the slip-ring seals 298*a*, 298*b*, 298*c*, 298*d* may be more readily deformable than seal rings 98*a*, 98*b*, 98*c*, 98*d* (FIG. 2) so that installation of the slip-ring seals 298*a*, 298*b*, 298*c*, 298*d* may be simplified relative to that used for seal rings 98*a*, 98*b*, 98*c*, 98*d*.

Generally speaking, slip-ring style seal rings (e.g., such as the slip-ring seals 298*a*, 298*b*, 298*c*, 298*d*) may be less robust than the chevron-style seal rings 98*a*, 98*b*, 98*c*, 98*d* shown in FIG. 2 and described above. As a result, each slip-ring seal 298*a*, 298*b*, 298*c*, 298*d* may have a lower pressure rating or tolerance than the seal rings 98*a*, 98*b*, 98*c*, 98*d*, previously described. However, during operations the total drilling fluid pressure is distributed (e.g., uniformly or evenly distributed) across the slip-ring seals 298*a*, 298*b*, 298*c*, 298*d* in the manner previously described above so that slip-ring seals 298*a*, 298*b*, 298*c*, 298*d* may provide adequate sealing performance, even for higher elevated pressures within washpipe 18 (e.g., such as 10,000 psig). Accordingly, slip-ring seals 298*a*, 298*b*, 298*c*, 298*d* may offer the benefit of reduced equipment costs and improved component design, while still providing adequate sealing performance within upper seal assembly 250. Further details of upper gland assembly 220 and upper seal assembly 250 are provided below in order to describe further aspects of these embodiments.

Upper gland assembly 220 includes a housing 290 having a first or upper end 290*a*, a second or lower end 290*b* opposite upper end 290*a*, and a through passage or cavity 292 extending between the ends 290*a*, 290*b*. A shoulder 296 is defined on an outer surface of housing 290 at or proximate to upper end 290*a* (e.g., so that shoulder 296 is positioned closer to upper end 290*a* than lower end 290*b* in some embodiments).

The housing 290 is inserted through a collar 300 so that shoulder 296 on housing 290 engages with a corresponding internal shoulder 302 defined in collar 300. The collar 300 includes a plurality of internal threads 294 that may threadably couple the collar 300 and housing 290 to the gooseneck 12 previously described and shown in FIG. 1. Upper end 18a of washpipe 18 is inserted within the through passage 292 from the lower end 290b.

Upper seal assembly 250 is positioned within through passage 292 and is positioned circumferentially around radially outer surface of 18c of washpipe 18 with respect to axis 17. As previously described, during operations, the washpipe 18 rotates about axis 17 relative to upper seal assembly 250 and upper gland assembly 220. Accordingly, the upper seal assembly 250 forms a dynamic seal with radially outer surface 18c of washpipe 18.

Upper seal assembly 250 includes the plurality of slip-ring seals 298a, 298b, 298c, 298d as previously described. During operations, the seal rings 298a, 298b, 298c, 298d are to engage with the radially outer surface 18c of washpipe 18 to prevent (or at least restrict) fluid flow (e.g., drilling fluid) between the radially outer surface 18c of washpipe 18 and housing 290. In some embodiments, there are a total of four slip-ring seals 298a, 298b, 298c, 298d; however, any suitable number of seal rings 298a, 298b, 298c, 298d may be included in the upper seal assembly 250 in other embodiments.

The slip-ring seals 298a, 298b, 298c, 298d may be axially spaced within the housing 290 with respect to axis 17. Thus, moving axially within the through passage 292 of housing 290 from the upper end 290a to the lower end 290b, the slip-ring seals 298a, 298b, 298c, 298d include a first seal ring 298a, a second seal ring 298b, a third seal ring 298c, and a fourth seal ring 298d. The first seal ring 298a may be more proximate the upper end 290a of housing 290 than the seal rings 298b, 298c, 298d, the fourth seal ring 298d may be more proximate the lower end 290b of housing 290 than the seal rings 298a, 298b, 298c, the second seal ring 298b may be axially positioned between the first seal ring 298a and the third seal ring 298c, and the third seal ring 298c may be axially positioned between the second seal ring 298b and the fourth seal ring 298d.

Figure 7:
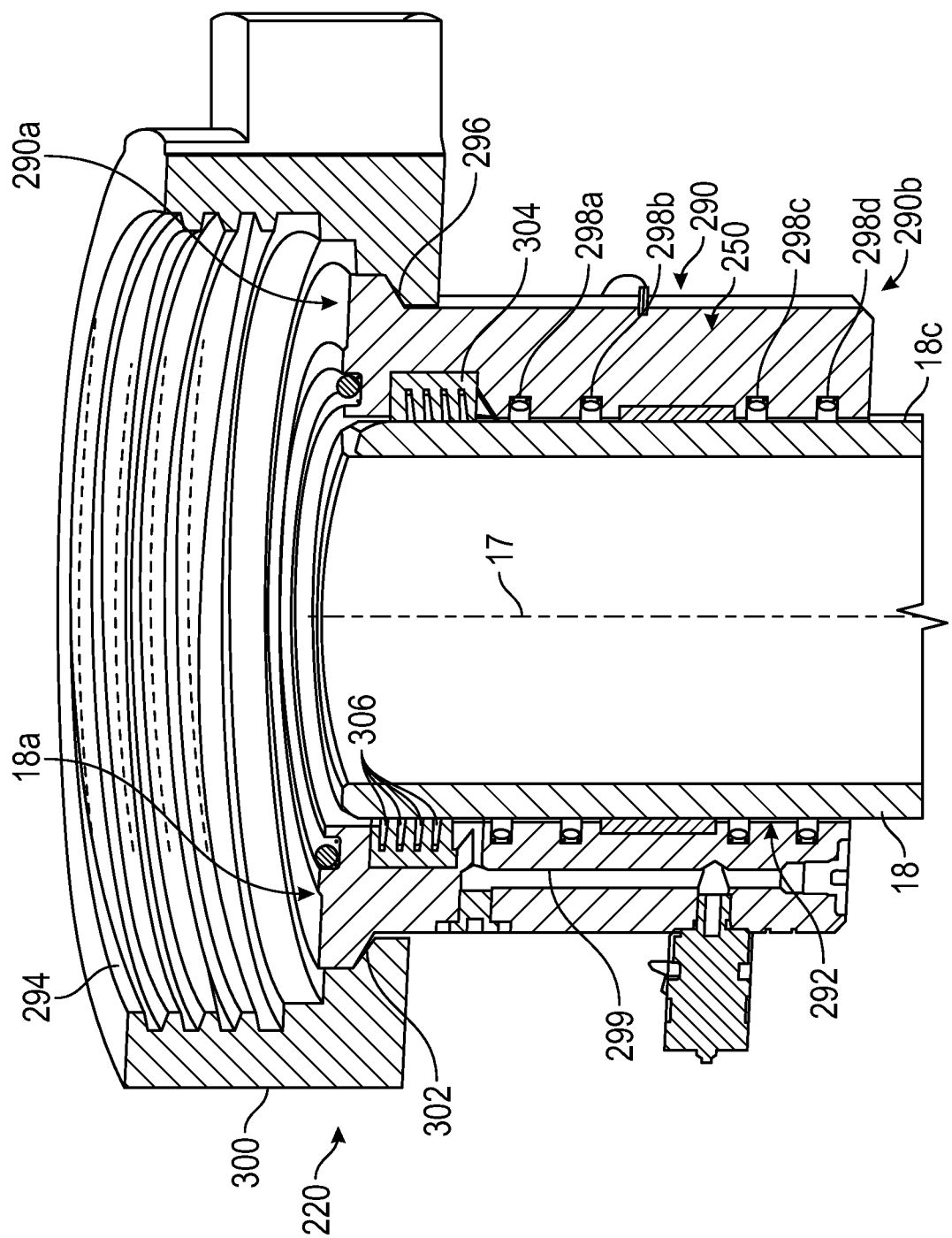
FIG. 7 is a perspective, cross-sectional view of an upper gland assembly and upper seal assembly for use in the rotational device of FIG. 1 according to some embodiments.

While not specifically shown in FIG. 7, a plurality of annular chambers are formed axially between the slip-ring seals 298a, 298b, 298c, 298d such as is described for the annular chambers 102a, 102b, 102c, 102d shown in FIG. 2. The annular chambers (not shown) may be in pressure communication with pressure manifold 120 (FIG. 3) in the same manner described above for annular chambers 102a, 102b, 102c, 102d. Thus, the annular chambers (not shown) between slip-ring seals 298a, 298b, 298c, 298d may be exposed to different fractions of the total drilling fluid pressure within washpipe 18 as previously described above for upper seal assembly 50 (FIG. 3). As a result, the total pressure of the drilling fluid within washpipe 18 may be distributed (e.g., evenly distributed) across the slip-ring seals 298a, 298b, 298c, 298d in the same manner previously described above.

A pressure port 299 may extend through housing 290 and into through passage 292. The port 299 may communicate with through passage 292 at a point axially positioned above the slip-ring seals 298a, 298b, 298c, 298d (e.g., between the seal ring 298a and upper end 290a of housing 290). The port 299 may be used to communicate the total drilling fluid pressure to the manifold 120 (e.g., the inlet port 130 shown in FIG. 3) during operations.

Referring still to FIG. 7, an isolation seal 304 is positioned within through passage 296, axially between the first seal ring 298a and upper end 290a. The isolation seal 304 comprises a comb-like annular member that includes a plurality of axially spaced, radially inwardly extending projections 306 that extend circumferentially about (relative to axis 17) and engage with the radially outer surface 18c of washpipe 18. During operations, the isolation seal 304 may form a labyrinth that is to hold grease or another suitable material within and about the slip-ring seals 298a, 298b, 298c, 298d, and that is to resist progression or flow of drilling fluid (and/or other potential contaminants) toward the slip-ring seals 298a, 298b, 298c, 298d along the radially outer surface 18c of washpipe 18.

The embodiments disclosed herein include seal assemblies for a washpipe of a rotational device that are configured to expose each of a plurality of sealing members to a portion of the total pressure of the drilling fluid. In some embodiments, the total pressure of the drilling fluid may be evenly divided or distributed among the plurality of sealing members. Thus, the sealing members of the embodiments disclosed herein may be exposed to generally lower pressures so that their operational life and pressure capability may be increased.

The discussion above is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In preceding discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A washpipe assembly for a rotational device, the washpipe assembly comprising:
   a gland assembly;
   a washpipe positioned within the gland assembly;
   a seal assembly positioned about the washpipe within the gland assembly, wherein the seal assembly comprises:
      a plurality of ring seals;
      a plurality of annular chambers positioned between the ring seals along the washpipe; and
      a pressure manifold comprising a plurality of manifold chambers and a plurality of plungers, wherein one plunger is disposed in each manifold chamber, and wherein each plunger has a first side and a second side opposite the first side, wherein the second side of each plunger is fluidly coupled to a corresponding one of the plurality of annular chambers;
   a plurality of fluid ports, wherein each manifold chamber is in fluid communication with one of the annular chambers via one of the fluid ports;
   wherein the pressure manifold is configured to receive a first fluid pressure, apply the first fluid pressure to the first side of each plunger within the corresponding manifold chamber, and apply a plurality of pressures to the annular chambers via the corresponding manifold chambers and fluid ports, wherein the plurality of pressures are each less than the first fluid pressure.

2. The washpipe assembly of claim 1, wherein the plurality of annular chambers comprises a first annular chamber and a second annular chamber,
   wherein the plurality of manifold chambers comprises a first manifold chamber and a second manifold chamber,
   wherein the first manifold chamber is fluidly coupled to the first annular chamber and the second manifold chamber is fluidly coupled to the second annular chamber,
   wherein a surface area on the first side of the plunger in the first manifold chamber is larger than a surface area on the first side of the plunger in the second manifold chamber, and
   wherein when the first fluid pressure is applied to the first side of the plunger in the first manifold chamber and to the first side of the plunger in the second manifold chamber, a pressure applied to the first annular chamber from the first manifold chamber is greater than a pressure applied to the second annular chamber from the second manifold chamber.

3. The washpipe assembly of claim 1, wherein pressure manifold is configured to apply the plurality of pressures to the plurality of annular chambers so that the plurality of seal rings are each exposed to a differential pressure that is a fraction of the first fluid pressure.

4. The washpipe assembly of claim 3, wherein the differential pressure exposed to each of the plurality of seal rings is the same fraction of the first fluid pressure.

5. The washpipe assembly of claim 3, wherein the seal rings comprise a chevron cross-section.

6. The washpipe assembly of claim 3, wherein the seal rings comprise slip ring seals.

7. A rotational device for rotating a drilling string and drill bit, the rotational device comprising:
   a washpipe including a central axis and a throughbore;
   a gland assembly to receive an end of the washpipe, wherein the washpipe is configured to rotate about the central axis relative to the gland assembly;
   a seal assembly positioned within the gland assembly and about the washpipe, wherein the seal assembly comprises:
      a plurality of seal rings axially spaced along the central axis;
      a plurality of annular chambers, wherein each of the annular chambers is axially spaced between axially adjacent pairs of the plurality of seal rings; and
      a pressure manifold comprising a plurality of manifold chambers and a plurality of plungers, wherein one plunger is disposed in each manifold chamber, and wherein each plunger has a first side and a second side opposite the first side, wherein the second side of each plunger is fluidly coupled to a corresponding one of the plurality of annular chambers;
      a plurality of fluid ports, wherein each manifold chamber is in fluid communication with one of the annular chambers via one of the fluid ports;
      wherein the pressure manifold is configured to receive a first fluid pressure from the throughbore of the washpipe, apply the first fluid pressure to the first side of each plunger within the corresponding manifold chamber, and emit a plurality of pressures to the plurality of annular chambers, via the corresponding manifold chambers, wherein the plurality of pressures are configured to expose each of the plurality of seal rings to a differential pressure that is less than the first fluid pressure.

8. The rotational device of claim 7, wherein a sum of the differential pressures exposed to the plurality of seal rings equals the first fluid pressure.

9. The rotational device of claim 8, wherein each differential pressure is an equal fraction of the first fluid pressure.

10. The rotational device of claim 7, comprising a rotating tubular member that is configured to be coupled to the drill string, wherein the washpipe is coupled to the rotating tubular member and is configured to rotate about the central axis along with the rotating tubular member.

11. The rotational device of claim 7, wherein a surface area of the first side of each of the plungers is different.

12. The rotational device of claim 11, wherein the differential pressure is the same for each of the plurality of seal rings.

13. The rotational device of claim 12, wherein the plurality of seal rings each comprise a chevron cross-section.

14. The rotational device of claim 12, wherein the plurality of seal rings comprise slip ring seals.

* * * * *